(12) United States Patent
Sieke et al.

(10) Patent No.: US 7,690,120 B2
(45) Date of Patent: Apr. 6, 2010

(54) ARRANGEMENT FOR RETRO-ACTIVELY CUTTING WIPER BLADES

(76) Inventors: Harald Sieke, Moserstrass 6, Darmstadt (DE) 64285; Martin Sieke, Kiesstrasse 56, Darmstadt (DE) 64283

( * ) Notice: Subject to any disclaimer, the term of this patent is extended or adjusted under 35 U.S.C. 154(b) by 0 days.

(21) Appl. No.: 10/528,400

(22) PCT Filed: Sep. 13, 2003

(86) PCT No.: PCT/DE03/03050

§ 371 (c)(1),
(2), (4) Date: Mar. 17, 2005

(87) PCT Pub. No.: WO2004/028761

PCT Pub. Date: Apr. 8, 2004

(65) Prior Publication Data

US 2006/0032057 A1    Feb. 16, 2006

(30) Foreign Application Priority Data

Sep. 20, 2002  (DE) ................................ 102 43 690

(51) Int. Cl.
*B26B 29/06* (2006.01)
*B26D 3/28* (2006.01)
(52) U.S. Cl. ............................ 30/293; 30/280; 30/294
(58) Field of Classification Search ................ 30/219.2, 30/233, 278, 279.2, 280, 281, 286, 289–294; 242/615, 615.3
See application file for complete search history.

(56) References Cited

U.S. PATENT DOCUMENTS

| | | | | | |
|---|---|---|---|---|---|
| 2,013,893 | A | * | 9/1935 | Matthews | ..................... 83/455 |
| 3,611,571 | A | * | 10/1971 | Belling | ......................... 30/280 |
| 3,886,657 | A | * | 6/1975 | Fabian | ........................... 30/294 |
| 4,604,802 | A | * | 8/1986 | Samuelsson | ................. 30/124 |
| 4,693,004 | A | * | 9/1987 | Plana | ............................ 30/265 |
| 5,027,515 | A | * | 7/1991 | Murdock | ...................... 30/292 |
| 5,044,081 | A | * | 9/1991 | Nguyen | ........................ 30/294 |
| 5,285,577 | A | * | 2/1994 | Carney et al. | ................. 30/294 |
| 5,381,601 | A | * | 1/1995 | Danter et al. | ................. 30/90.1 |
| 5,809,652 | A | * | 9/1998 | Ducret | ......................... 30/90.7 |
| 5,848,471 | A | * | 12/1998 | Freeland | ....................... 30/280 |
| 6,581,291 | B1 | * | 6/2003 | Tarpill et al. | .................. 30/90.4 |
| 2001/0034919 | A1 | * | 11/2001 | Faggiotto | .................. 15/236.06 |

FOREIGN PATENT DOCUMENTS

| | | |
|---|---|---|
| DE | 3120679 A1 | 5/1981 |
| DE | 3509786 A1 | 3/1985 |

(Continued)

*Primary Examiner*—Boyer D. Ashley
*Assistant Examiner*—Edward Landrum
(74) *Attorney, Agent, or Firm*—Karl F. Milde, Jr.; Eckert Seamans Cherin & Mellott, LLC (57) ABSTRACT

The invention relates to an arrangement for retro-actively cutting wiper blades, comprising a first guiding element (D) which engages in grooves which are arranged on both sides of the wiper blades, and a second guiding element (L) which is arranged in close proximity to the edge of the lip (M) of the wiper blade which is to be retro-actively cut. A blade (J) is arranged in close proximity to the second guiding element (L). The second guiding element (L) has a fixed width such that the lip (M) of the wiper blade is guided in a smooth-running manner.

11 Claims, 11 Drawing Sheets

FOREIGN PATENT DOCUMENTS

| | | | |
|---|---|---|---|
| DE | 3510738 A1 | 5/1985 |
| DE | 3510738 * | 10/1986 |
| DE | 3510738 A1 * | 10/1986 |
| DE | G 86 33 847.2 | 12/1986 |
| DE | G 87 16 269.5 | 12/1987 |
| DE | 4110799 A * | 4/1991 |
| DE | 4110799 A1 | 4/1991 |
| DE | 4110799 A1 * | 8/1991 |
| DE | 29606561 U1 | 4/1996 |
| DE | 29606561 U1 * | 8/1996 |
| DE | 2960656 U1 * | 4/1998 |
| GB | 93 11 510.5 | 12/1993 |
| GB | 94 05 275.1 | 3/1994 |

\* cited by examiner

ARRANGEMENT FOR RETRO-ACTIVELY CUTTING WIPER BLADES

The invention relates to an arrangement for retro-actively cutting wiper blades comprising a first guide, engaging in grooves on both sides of the wiper blade, and a second guide in close proximity to the edge of the lip of the wiper blade to be cut retro-actively.

The quality of the wiping process for wipers depends very much on the state of the edges of the wiper blade. However, due to sharp-edged particles adhering to the wind-screen or due to surface hardening caused by atmospheric influences or by age, damage to the edges of the wipers occurs, negatively affecting the wiping result or resulting in noise development. Regular replacement of the wipers is therefore recommended, which is relatively expensive. For this reason, proposals have already been made to process wiper blades, namely by abrasion or retroactive cutting.

An apparatus for retroactive cutting is known, for example, from DE 86 33 841 U1. In the case of this apparatus, the wiper blade to be cut retroactively is pulled through a guiding groove, having approximately the negative profile of the wiper blade and wherein in level-adjustable manner a quarter circle-shaped blade is disposed. However, retroactively cutting wiper blades is only useful if an extremely accurate cut is performed. This is, however, not possible in the case of the known wiper blade plane, inter alia because the lip of the wiper blade is deformed in a disadvantageous manner due to the cutting forces acting on the quarter-circle shaped blade.

With DE 35 10 738 A1 a device for retro-actively cutting wiper blade lips has become known, wherein the wiper blade is double-guided. The one guide holds the wiper blade in the region of the grooves disposed on both sides, their purpose on the wiper blade being to permit the lip to flip over when the direction of the wiping process changes, so that it is always pulled—and not pushed—across the windscreen. A second guide in the known device for retroactively cutting wiper blade lips is positioned in close proximity to the edge to be cut retroactively. In this device, because of possibly different lip widths, an automatic adjustment of the width of this guide to the respective wiper lip width is provided. This is done in that the lip is introduced, in a pre-tensioned state, into the guide formed by two parallel-extending sheet metal strips. This results in the occurrence of frictional forces in the second guide, likewise deforming the sensitive lip in a manner impairing the cutting process.

It is an object of the present invention to obtain a perfect cut when retroactively cutting wiper blades, with an arrangement which can be handled by anybody. This object is attained according to the invention in that a blade is disposed in close proximity to the second guide and that the second guide has a fixed width such that the lip of the wiper blade is guided in a smooth-running manner.

The invention is based on the knowledge that deformations of the wiper blade and, in particular, the lip result in irregular cuts, inter alia wave-shaped deviations from the ideal line. Due, in particular, to the configuration of the second guide, deformations of the wiper blade are therefore largely avoided, this being furthermore promoted by a blade, which is as thin as possible. Detailed tests have shown that with a fixed width of the second guide the lips of nearly all available wiper blades are guided sufficiently well, to the extent that a perfect cut is produced.

The invention may preferably be designed as a simple apparatus through which the wiper blade to be cut retroactively is guided by hand. However, mechanical or automated operation, including motor-driven operation, is likewise possible. For controlling the number of cutting processes performed, a counter may also be provided.

In the following, the direction of movement will be denoted as longitudinal direction of the wiper blade and the direction transverse thereto as the transverse direction. The direction normal to the plane defined by the wiper edges will be denoted in the following as the direction of cutting.

An introduction of the wiper blade into the second guide is facilitated in that the second guide tapers from a relatively large width in the direction of movement to a fixed width. This may be attained by a V-shaped introduction region of the second guide, followed by a region having the fixed width. However, within the scope of the invention other configurations of the second guide are likewise possible, facilitating the introduction, for example curved or spherical guides.

An advantageous embodiment consists in that the second guide has a depth comprising the portion of the lip to be cut off.

Since the cut-off portion of the lip represents a very thin and therefore flexible strip, which may under no circumstances get jammed, another advantageous embodiment provides that the second guide, starting at the cutting edge of the blade, expands into a discharge passage. Preferably, the discharge passage has a width and a depth of at least twice the width of the lip. This discharge passage, as closely behind the cutting edge as possible, merges into a discharge passage having a larger cross-section.

A compact, easily manageable form of the arrangement according to the invention is provided by another advantageous embodiment, with the feature that the second guide forms a cutting unit with the blade, mounted in an adjustable manner in the direction of cutting.

In this context, it is preferably provided that the first guide forms part of a basic body and that the cutting unit is mounted in an adjustable manner in the basic body and/or that a further discharge passage is disposed in the basic body, the cross-section of which corresponds at least to that of the discharge passage and/or that for adjusting purposes a spindle is disposed on the cutting unit, which is in interactive play-free communication with a spindle nut mounted in a recess of the basic body.

In order to prevent maladjustment during the cutting process, another advantageous embodiment may provide that the position of the cutting unit may be locked. It was found to be advantageous for the first guide to be longer than the second guide, namely preferably having a length of between 70 mm and 200 mm.

Stable guidance of the wiper blade is in this context promoted if the first guide is curved in the longitudinal direction of the wiper blade. However, a straight or only partially curved first guide is, in principle, likewise acceptable.

In order to permit a setting of the cutting depth, in each case adapted to the prevailing lip height, a further development of the invention makes provision for a measuring device. In particular, the measuring device may be formed by a scale in a passage receiving the wiper blade and an observation aperture or by a scale on either side of a passage receiving the wiper blade and a movable stop member or by a movable feeler gauge.

A further possibility to facilitate the setting of the cutting depth is the provision of a viewing device at a preset distance from the blade in the direction of cutting. If the preset distance corresponds to the desired cutting depth, setting of the cutting depth may be performed as follows:

If the user adjusts the cutting depth while looking through the viewing device, the cutting depth is then correctly set at the instant when the edge of the wiper blade just unblocks or blocks the view—depending on the direction in which the adjustment is performed. The distance may, however, also be selected differently, so that the cutting depth, after observation, must be changed by a predetermined distance, for example by one turn of an adjusting screw.

Another further development of the arrangement according to the invention provides that the second guide has a surface, which reduces friction. This may be done by applying an appropriate coating, for example, Teflon, by applying a lubricant and/or by appropriately structuring the surface.

A further advantageous embodiment is provided in that a plurality of first guide are disposed in a body. It may further be provided that a body has the form of a hollow cylinder or prism, open on one side, encompassing a basic body with a cutting unit like a lid, in which context the body and the basic body are adjustable in relation to one another in the direction of their axis. The prism may comprise bases in the form of an equilateral polygon. The adjustment may preferably be attained in that the cylinder or the prism and the basic body are rotatably interconnected for adjusting purposes by means of a thread.

In an advantageous embodiment of the invention it is provided that the cutting edge of the blade is positioned normal to the direction of movement and normal to the direction of cutting. This makes it possible to achieve good cutting results. However, other angle positions and blade shapes are likewise possible.

Thus, it may, for example, be provided that the blade is positioned obliquely in the cutting direction, that the blade is bent over in the cutting direction such that the cutting area is V-shaped, that the blade is curved in the cutting direction such that a concave cutting area comes about and/or that the cutting edge of the blade extends arrow-like in the direction of movement of the wiper blade.

In the arrangement according to the invention, preferably an extremely thin blade is used, having a low stability per se. In order to nevertheless obtain clean cuts, means are provided according to a further development of the invention for fixing the position of the blade in the cutting region. The latter secure the blade in relation to its position, in particular the cutting depth, its torsion and its rotation.

Preferably, the blade is supported firmly on surfaces directly adjoining the cutting region. This may be performed by clamping or adhesive bonding. Even in the event that, for structural reasons, the actual fixation is performed remote from the second guide, the fixation in relation to the surfaces directly adjoining the cutting region may be ensured by appropriate bending and/or tensile stress.

Another possibility for adjusting the cutting depth may be provided a limitation on the first guide in the cutting direction, being adjustable with the cutting unit and having a preset position towards the cutting edge in the cutting direction. The user can then increase the cutting depth until the limiting device comes to rest against the surface of the wiper blade to be retro-actively cut, whereafter this setting is moved back slightly.

A further advantageous device for measuring the cutting depth is formed in that a stop member, adjustable together with the blade, is provided and a guide, engaging in at least one of the grooves of the wiper blade, is positioned opposite the stop member.

This device may be so designed that the stop member is disposed at the end of a passage intended for the wiper blade and that the guide is formed by a terminal region of the first guide. In this context, the stopper device may or may not protrude from the passage. The stop member should, however, be visible.

The measuring device may also be so designed that the stop member protrudes laterally from the arrangement and a shoulder moulded onto the longitudinal side of the arrangement forms the guide.

Working examples of the invention are shown in the drawing by way of a plurality of figures and are elucidated in detail in the following description. There is shown in.

The same reference symbols are used in the figures for those parts which have identical functions, but which may differ from one another in some details.

The embodiment shown in figures 1 to 6 comprises a basic body A, which is so designed that it can easily be hand-held. In the longitudinal direction a passage N passes through the basic body, the said passage N being limited at its outer extremity by two webs D, forming the first guide-also referred to in what follows as a two-dimensional (2D) wiper guide. On one end of the wiper guide is situated a feeding aid (FIGS. 21, 23 and 24) W. Due to the curvature of the wiper guide, good positioning and slight pretensioning of the wiper blade, not shown, is brought about, promoting stabilization during cutting.

A cutting unit B is displaceably mounted inside the basic body A, for which purpose it comprises appropriate guides which will be explained further below. By means of the vertical adjusting device shown in FIG. 4 the distance between the first and the second guide and, therefore, the blade, is set. For this purpose the cutting unit B is connected to a threaded rod F. An adjusting wheel E comprises a matching thread so that by turning the adjusting wheel the cutting unit B may be displaced. Optionally, a scale is provided on the adjusting wheel in order to read the respective setting.

Figure 1:
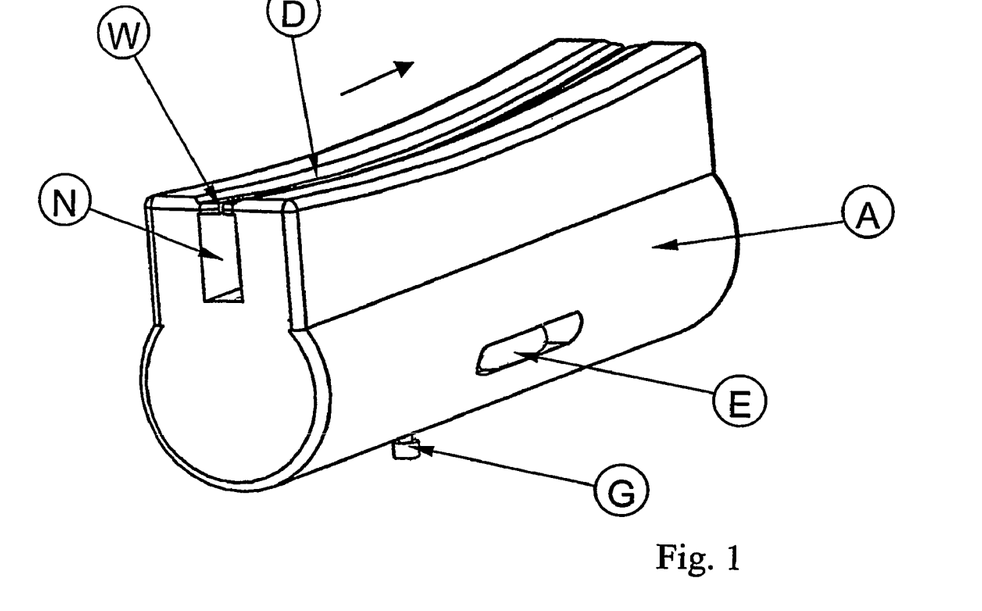
FIG. 1 a three-dimensional illustration of an embodiment.
Figure 2:
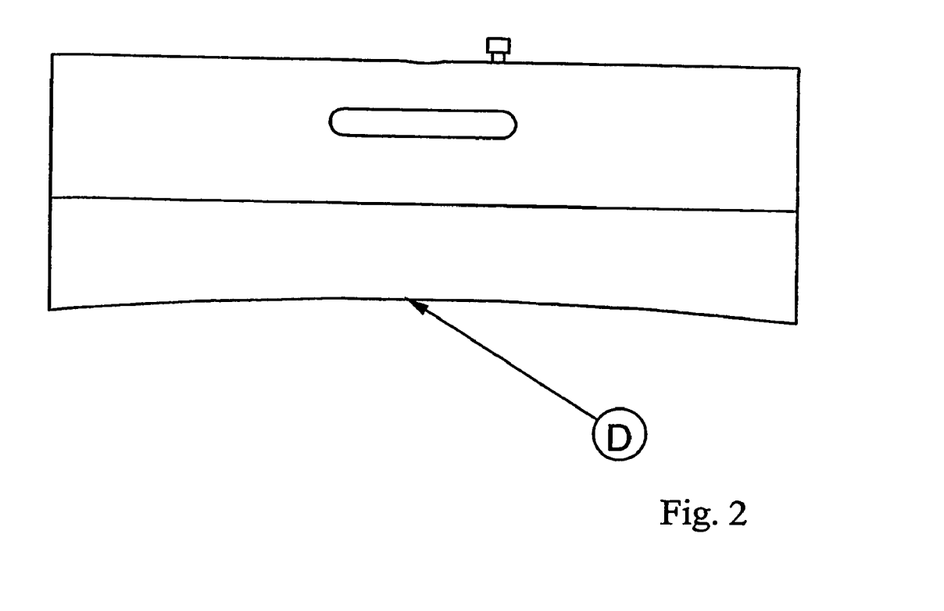
FIG. 2 to FIG. 6 different views of the same embodiment.
Figure 3:
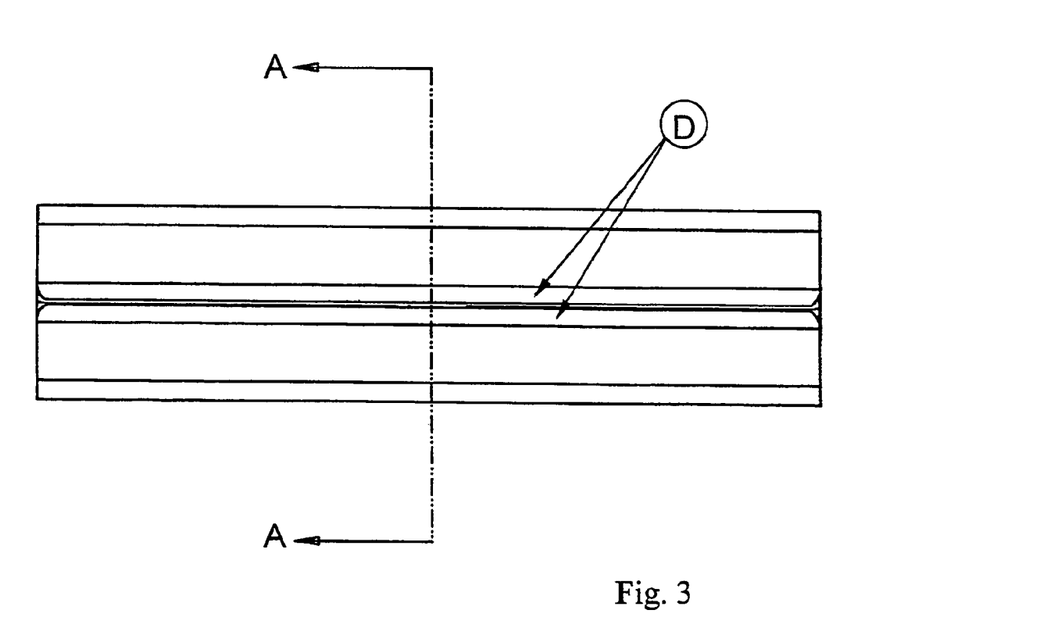
Figure 4:
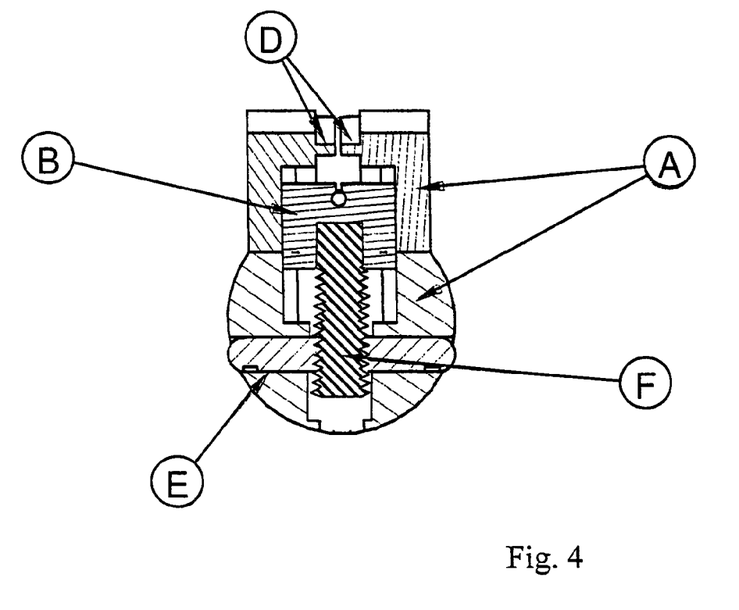
Figure 5:
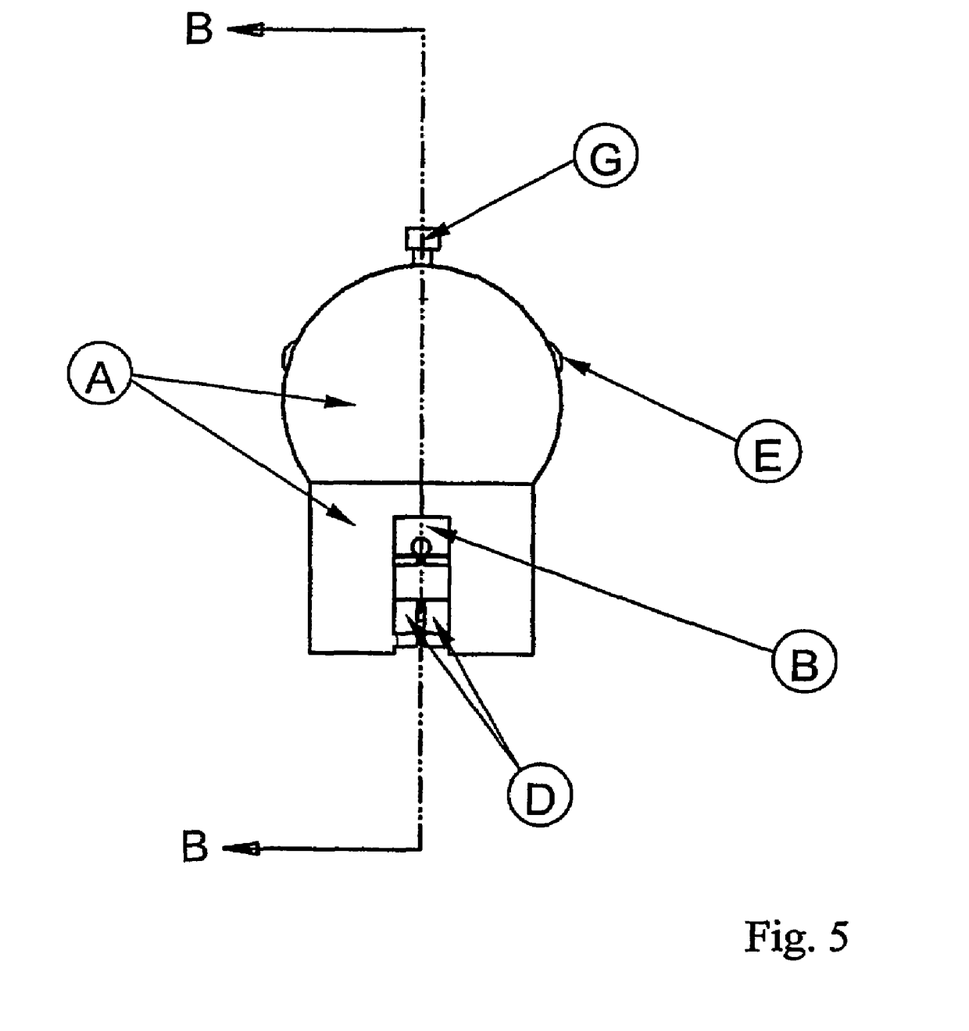
Figure 6:
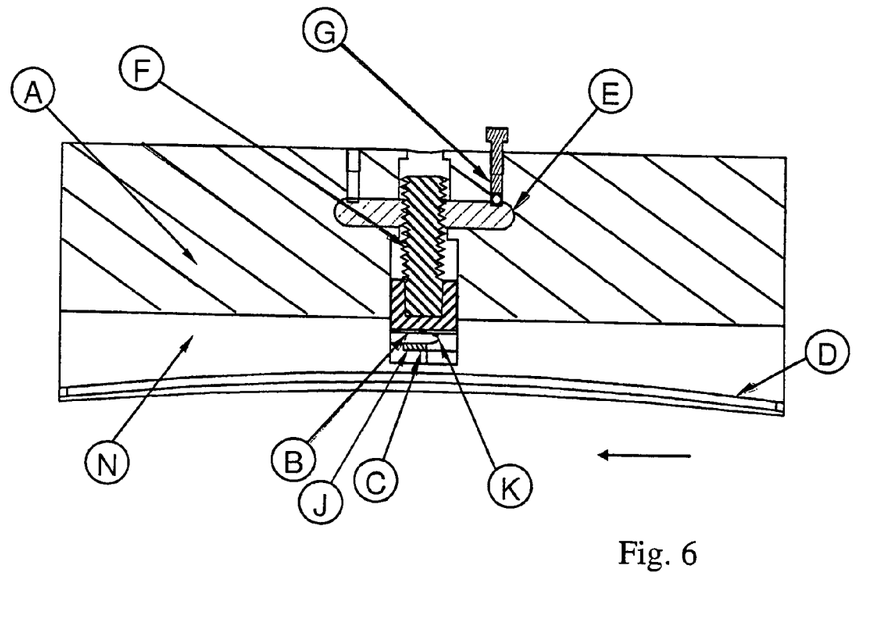

In order to fix the positioning of the adjusting wheel, there is provided a screw G with a knurled head. The cutting unit B projects into the passage N and comprises the second guide L, the cutting blade J, supported in part by element C, and an introduction passage K for the lip M of the wiper blade, which in FIG. 6 is fed from the right in the direction of the arrow.

Figure 7:
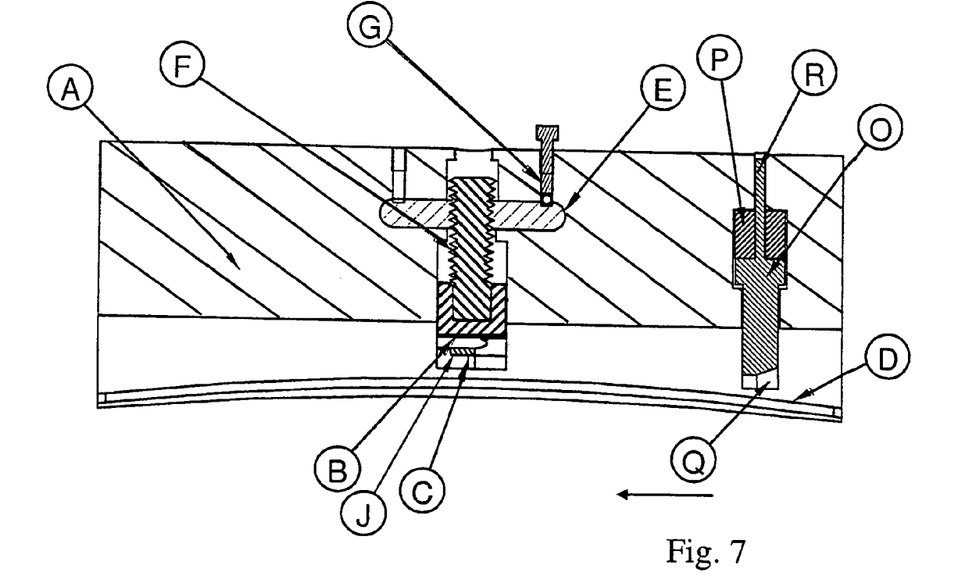
FIG. 7 to FIG. 10 different embodiments including a measuring device.

In the embodiment according to FIG. 7, in addition a measuring device is integrated in the basic body A. This measuring device consists of a measuring pin O, pressed down by a spring P, an introduction passage Q being provided for the lip. When the lip is inserted, the measuring pin moves upwardly against the force of the spring P so that an extension R of the measuring pin O emerges from the surface of the basic body A. The extension comprises a scale, not shown, from which the level of the lip may be read. This reading is then transmitted to the cutting unit B by the adjusting wheel E.

Figure 8:
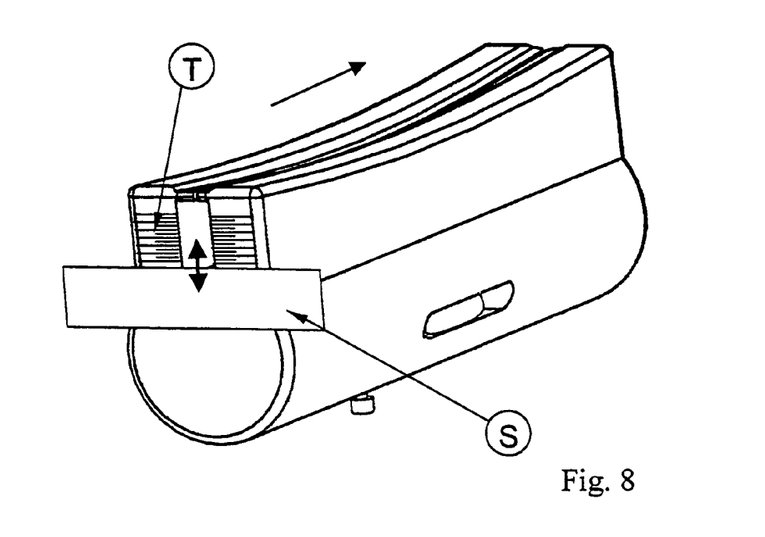

FIG. 8 illustrates an embodiment comprising a different measuring device, that is to say, scales T are disposed in this case on the end face of the basic body on both sides of the passage. When inserting the wiper blade, a gauge S may be displaced against the wiper blade in the direction of the double-arrow, as a result of which the level of the wiper may be detected. The detected value is then used for setting the cutting depth.

Figure 9:
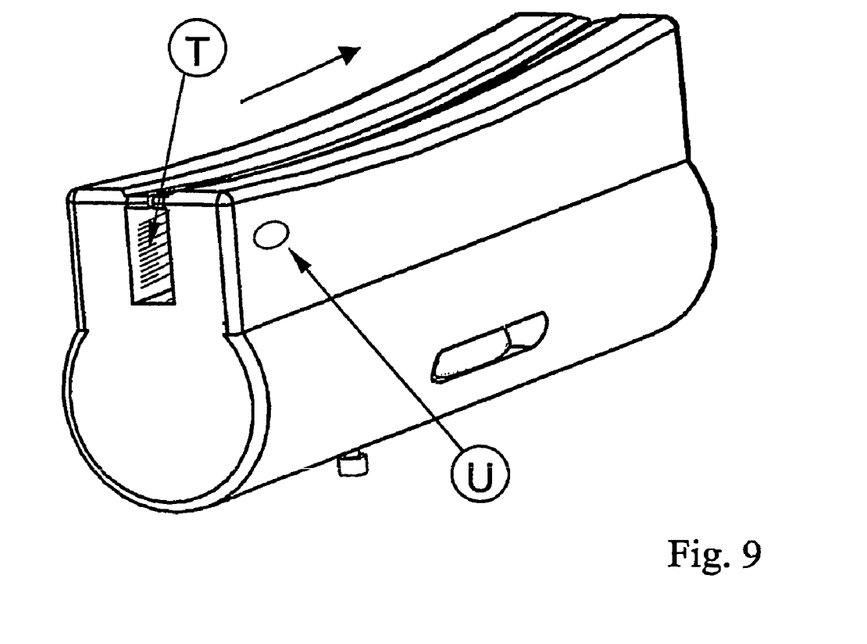

A further possibility for determining the setting for the cut is shown in FIG. 9, in which context the scale T is disposed within the passage and reading may be performed through a window U, which, if required, may be designed as a magnifying glass, the wiper blade being partially inserted.

Figure 10:
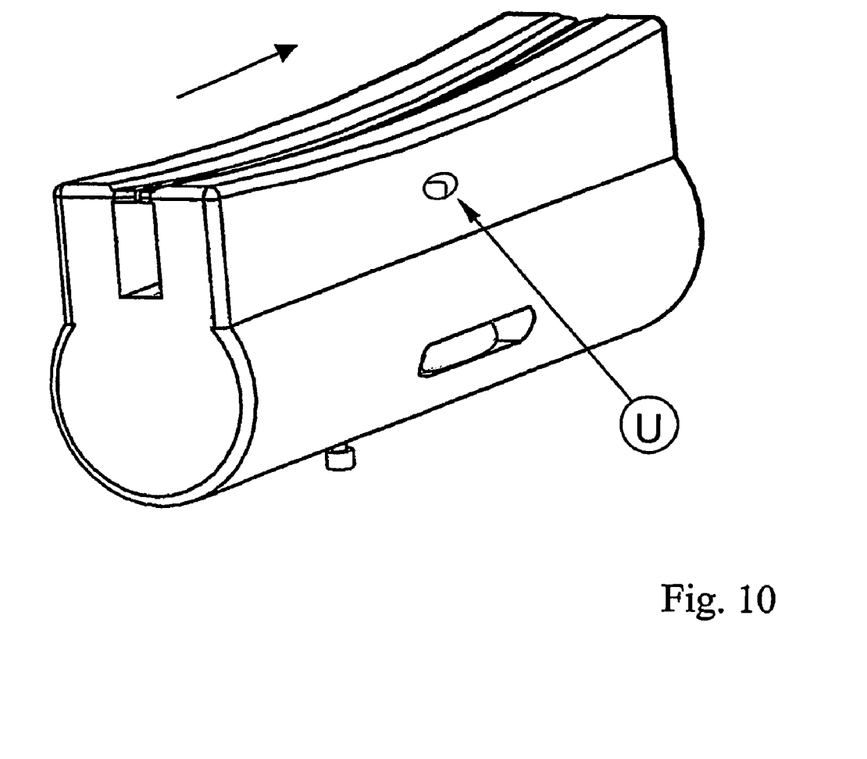

FIG. 10 shows an embodiment with a viewing hole U, passing through the basic body in transverse direction. An even smaller viewing hole is present in the cutting unit. The cutting depth is then so adjusted that the smaller viewing hole only just corresponds to the edge of the wiper blade to be cut.

Figure 11:
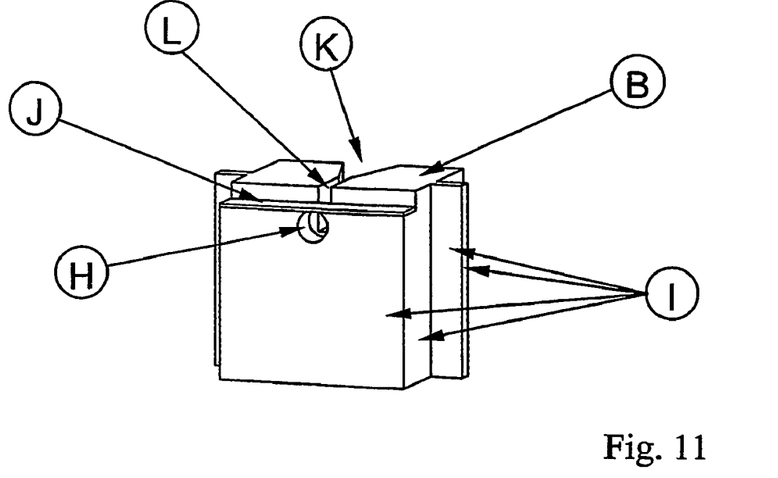
FIG. 11 to FIG. 13 different views of a cutting unit.
Figure 12:
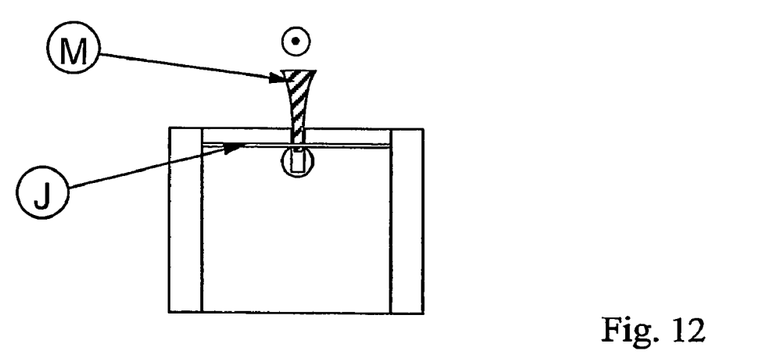
Figure 13:
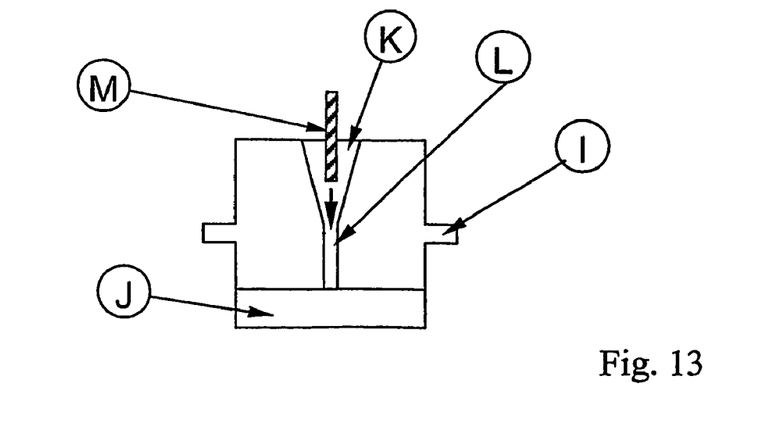

The cutting unit shown in FIGS. 11 to 13 comprises two guiding webs and guiding surfaces I, which fit into correspondingly formed portions of the basic body without play. A feed passage K tapers in the direction of movement of the wiper blade towards the second guide L. Onto this follows the blade J. Immediately below the cutting edge of the blade J the guide L expands into a discharge passage H, into which the cut-off strips may exit in an unimpeded manner.

FIG. 12 further shows the wiper lip M in its position in the cutting unit in relation to the blade J during insertion. FIG. 13 illustrates the front end of the wiper lip M while being inserted into the second guide L via the introduction passage K.

FIGS. 14 to 20 show various embodiments of the cutting unit, which differ from the cutting unit elucidated above inter alia by a different shape of the guide within the basic body.

Figure 14:
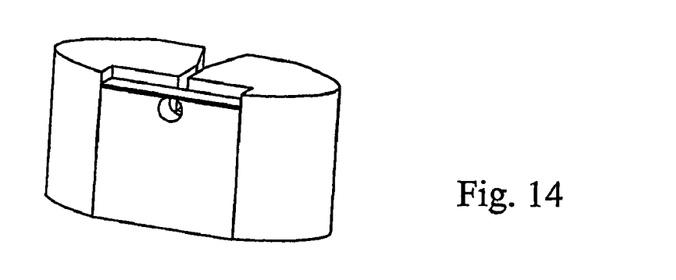
FIG. 14 to FIG. 20 different embodiments for the cutting unit.
Figure 15:
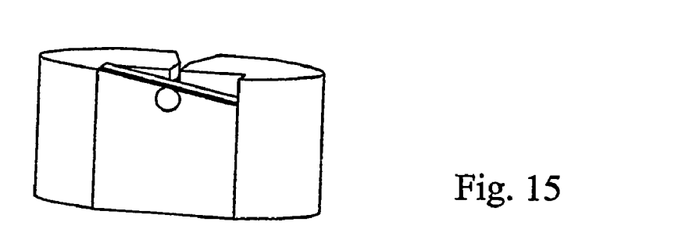
Figure 16:
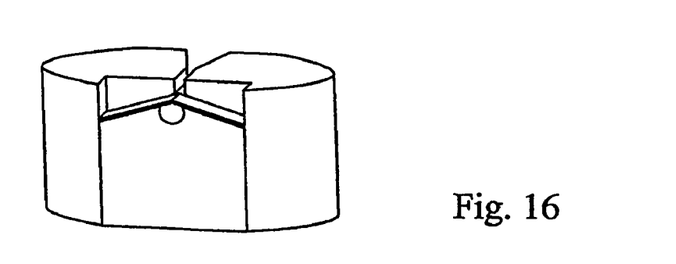
Figure 17:
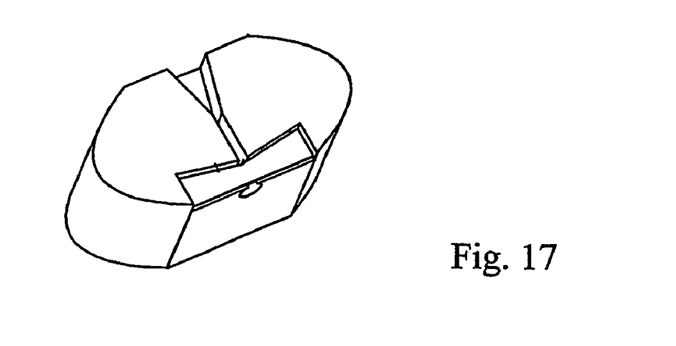
Figure 18:
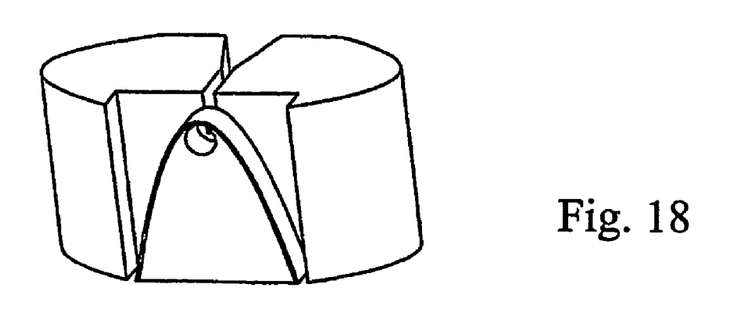

In FIGS. 14 to 20 different blade arrangements are shown, which may be used within the scope of the invention. FIG. 14 thus shows a straight blade, FIG. 15 an oblique blade, FIG. 16 a bent over blade and FIG. 18 a curved blade, while the blade according to FIG. 17 comprises an arrow-shaped cutting edge.

Figure 19:
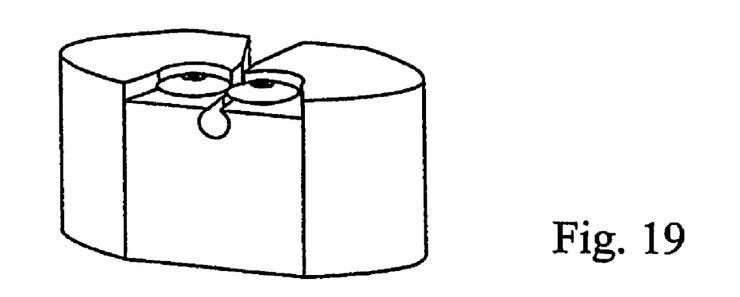
Figure 20:
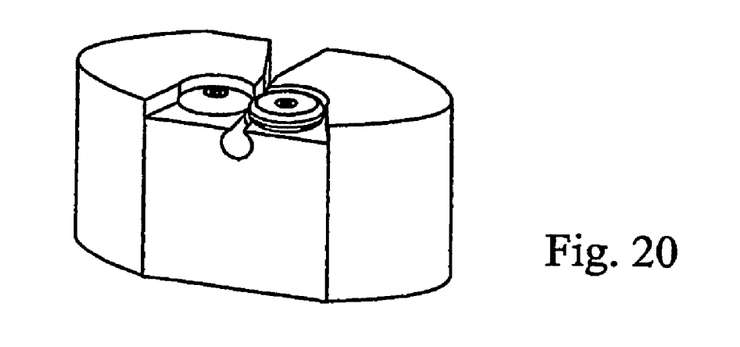

Within the scope of the invention, cutting wheels are likewise possible. FIG. 19 shows, for example, two cutting wheels working in opposite direction, while FIG. 20 shows a cutting wheel with a counter rotation surface.

Figure 21:
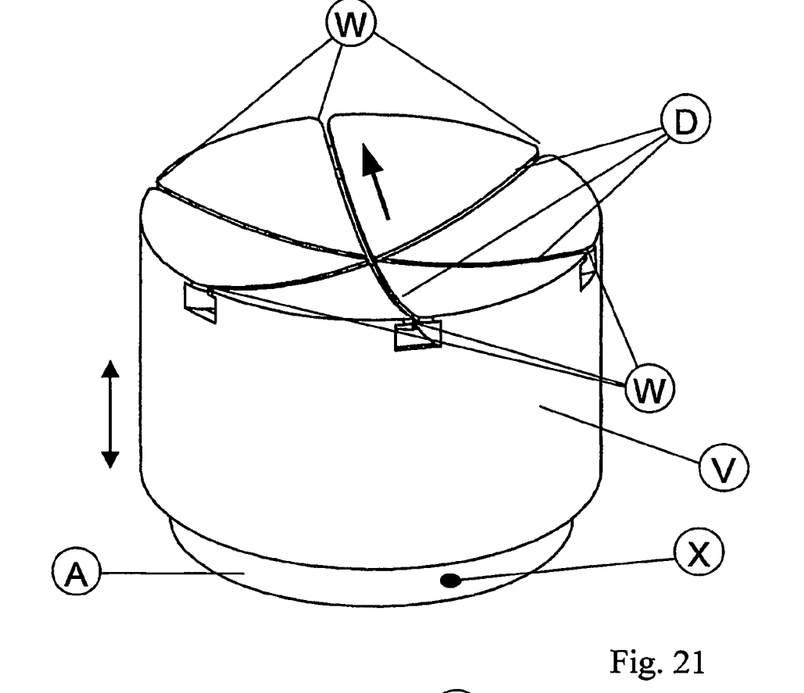
FIG. 21 and FIG. 22 two views of a further embodiment of the arrangement according to the invention, FIG. 23 a device for measuring the cutting depth and FIG. 24 a further device for measuring the cutting depth.
Figure 22:
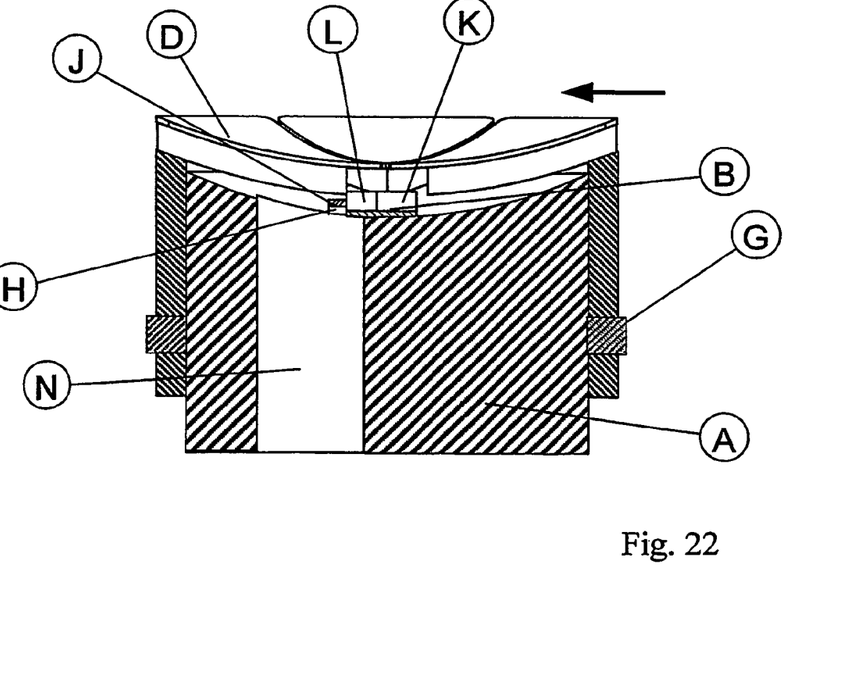

FIG. 21 and FIG. 22 show an arrangement according to the invention comprising three 2D-wiper guides D, disposed in a hollow cylindrical body V. Accordingly, three feed passages W for wiper blades are provided. By turning the saucer-shaped body V about a cylindrical basic body A, carrying the cutting unit B ( FIG. 21), the cutting level may in this case likewise be adjusted. A marking X indicates to which of the 2D-wiper guides D the basic body A comprising the cutting unit B is adjusted.

The discharge passage N does not extend in this embodiment parallel to the passage for the wiper, but vertically in downward direction. A further possibility for adjusting the required cutting depth might in this embodiment be provided by different curvatures of the body V and the basic body A, which may be matched in such a manner that the basic body A drives against the wiper lip with the uppermost edge and may be set back for the next cutting mode.

Figure 23:
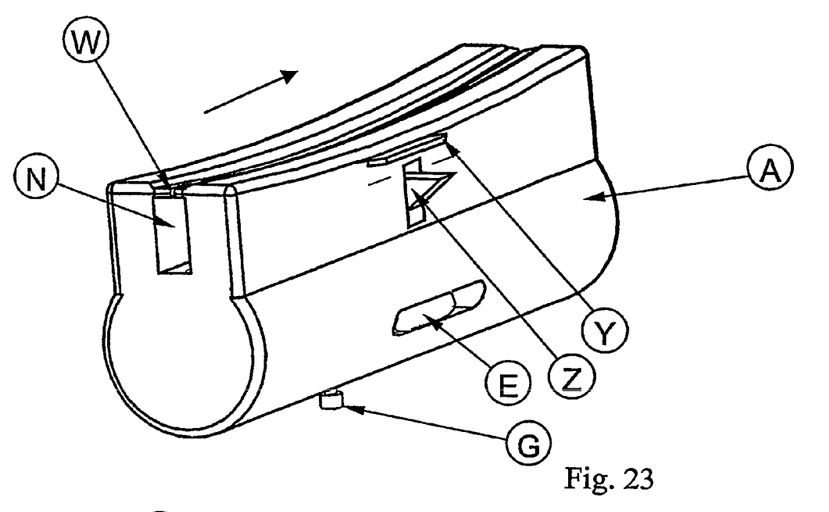
Figure 24:
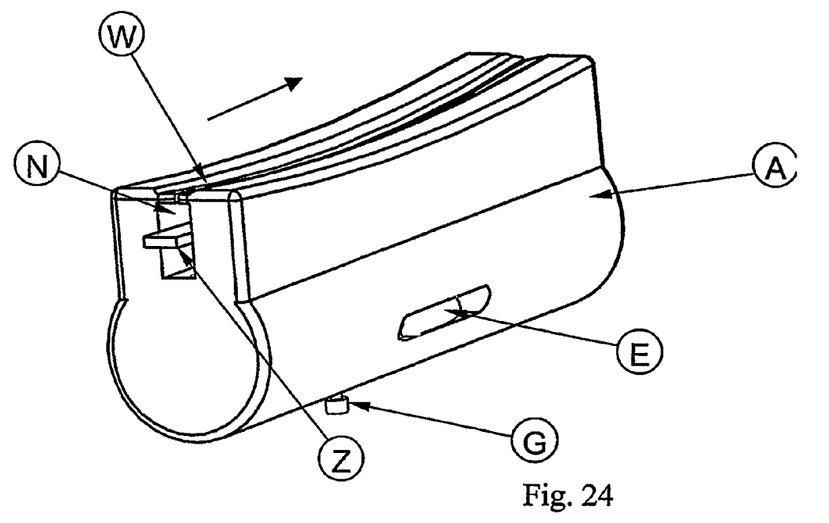

FIGS. 23 and 24 show embodiments, which each comprise a measuring device, by means of which the cutting depth is determined, making it thus possible to set the cutting unit. In the embodiment according to FIG. 23 stop member Z protrudes laterally from the basic body through an elongated slit. The stop member Z is rigidly connected to the cutting unit—namely in such a manner that the upper edge of the stop member is positioned lower than the cutting edge by that amount, which is to be cut off from the wiper lip. A guide Y, positioned on the same level as the first guide W, is inserted into the groove of the wiper blade when the cutting depth is set, whereupon the stop member Z is adjusted by the adjusting wheel in such a manner that it barely touches the edge of the wiper blade not yet cut.

The position of the guide Y of the stop member Z may also be displaced in relation to the first guide situated within the arrangement and in relation to the cutting edge. What matters is that the relative position of the guide in relation to the abutment corresponds to the desired cutting depth.

In the embodiment according to FIG. 24 the stop member Z projects from the passage N. The first guide W serves in this case also as a guide for measuring purposes.

The invention claimed is:

1. A device for trimming a lip of a windshield wiper blade, said device comprising, in combination:
   a basic body with a longitudinal passage having a longitudinal entrance extending the length of said passage;
   a first wiper blade guide disposed adjacent the entrance to said passage, said first wiper blade guide comprising two longitudinal webs arranged on said body on opposite sides of said entrance in facing relationship to each other, for guiding the wiper blade between them; and
   a cutting unit disposed in said passage and adjustably mounted in said basic body, said cutting unit including at least one cutting blade defining a cutting plane parallel to the direction of movement of the wiper blade, and a second wiper blade guide disposed in the cutting plane and forming a fixed width channel adapted to support and guide on both sides of the lip of the wiper blade during cutting; and
   means for adjusting the position of the cutting unit with respect to the first wiper blade guide, thereby to set the desired position of the cutting unit prior to cutting, said means comprising a stop member, rigidly connected to the cutting unit and protruding from said body, to indicate the depth of cut relative to the first guide.

2. The wiper blade cutting system according to claim 1, wherein said second blade guide tapers in a direction of movement of the wiper blade, from a relatively large width to a fixed width.

3. The wiper blade cutting system according to claim 1, wherein said second blade guide has a depth which covers the portion of said lip of said wiper blade to be cut.

4. The wiper blade cutting system according to claim 1, wherein said second blade guide, starting at said cutting blade, expands into a discharge passage.

5. The wiper blade cutting system according to claim 1, wherein said means for adjusting the position of the cutting unit includes a spindle in said cutting unit, said spindle communicating interactively and play-free with an adjusting wheel mounted in a recess of said basic body.

6. The wiper blade cutting system according to claim 1, wherein the position setting of said cutting unit is lockable.

7. The wiper blade cutting system according to claim 1, wherein said first wiper blade guide is curved in the longitudinal direction of the wiper blade.

8. The wiper blade cutting system according to claim 1, wherein the cutting edge of the blade is positioned normally to a direction of movement of the wiper blade and normal to a cutting direction.

9. The wiper blade cutting system according to claim 1, further comprising means for fixing the position of the cutting blade in the cutting region.

10. The wiper blade cutting system according to claim 1, wherein the entrance to said longitudinal passage, and said first wiper blade guide, are curved.

11. The wiper blade cutting system according to claim 1, further comprising a guide member, rigidly connected to and protruding from the body adjacent the stop member, to indicate the position of the first guide with respect to the stop member.

* * * * *